United States Patent
Nakano et al.

(10) Patent No.: US 9,513,415 B2
(45) Date of Patent: Dec. 6, 2016

(54) OPTICAL FILTER CONFIGURED TO TRANSMIT LIGHT OF A PREDETERMINED WAVELENGTH

(71) Applicant: Sharp Kabushiki Kaisha, Osaka-shi, Osaka (JP)

(72) Inventors: Takashi Nakano, Osaka (JP); Mitsuru Nakura, Osaka (JP); Kazuya Ishihara, Osaka (JP); Nobuyoshi Awaya, Osaka (JP); Kazuhiro Natsuaki, Osaka (JP); Takahiro Takimoto, Osaka (JP); Masayo Uchida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 141 days.

(21) Appl. No.: 14/307,626

(22) Filed: Jun. 18, 2014

(65) Prior Publication Data
US 2015/0036217 A1 Feb. 5, 2015

(30) Foreign Application Priority Data
Aug. 5, 2013 (JP) ................................. 2013-162111

(51) Int. Cl.
*G02B 5/18* (2006.01)
*G02B 5/20* (2006.01)
*G02B 5/00* (2006.01)

(52) U.S. Cl.
CPC ............... *G02B 5/203* (2013.01); *G02B 5/008* (2013.01); *G02B 5/204* (2013.01)

(58) Field of Classification Search
CPC ........... G02B 5/20; G02B 5/008; G02B 1/116; G02B 1/002; G02B 1/005; G02B 5/204; G02B 5/3058; G02B 5/18; G02B 2005/1804; G02B 5/1809; G02B 5/1866; G02B 27/42; G02B 27/4233; G02B 27/4244; B02B 5/203
USPC ............... 359/308, 568, 558, 566, 569, 574, 576,359/485.05, 487.03, 489.06; 362/19; 353/20
See application file for complete search history.

(56) References Cited

U.S. PATENT DOCUMENTS

| | | | |
|---|---|---|---|
| 5,973,316 A | 10/1999 | Ebbesen et al. | |
| 6,052,238 A | 4/2000 | Ebbesen et al. | |
| 2009/0296246 A1 | 12/2009 | Yamada et al. | |
| 2010/0176280 A1* | 7/2010 | Yokogawa | G02B 5/201 250/226 |

(Continued)

FOREIGN PATENT DOCUMENTS

| | | | |
|---|---|---|---|
| EP | 2128665 A1 * | 12/2009 | ............ B82Y 20/00 |
| JP | 3008931 B2 | 2/2000 | |

(Continued)

OTHER PUBLICATIONS

Boltasseva et al., "Low-Loss Plasmonic Metamaterials: New Materials are being developed that meet the requirements for nanoscale photonics", Science, vol. 331, Jan. 21, 2011, pp. 290-291.

(Continued)

*Primary Examiner* — Arnel C Lavarias
(74) *Attorney, Agent, or Firm* — Keating & Bennett, LLP

(57) ABSTRACT

An optical filter configured to transmit light of a predetermined wavelength includes a substrate; a first conductive thin film that is disposed on the substrate and has apertures extending through the first conductive thin film and arranged with a period of less than the predetermined wavelength; and a second conductive thin film at least a portion of which faces the apertures so as to be separated from the apertures.

6 Claims, 14 Drawing Sheets

(56) References Cited

U.S. PATENT DOCUMENTS

2012/0038995 A1 2/2012 Yamada et al.
2012/0129269 A1* 5/2012 Choi .................... A61B 5/0075
    436/164

FOREIGN PATENT DOCUMENTS

JP      2010-160212 A    7/2010
JP         4995231 B2    8/2012
WO    WO2006102275 A2 *  9/2006

OTHER PUBLICATIONS

Tassin et al., "A Comparison of Graphene, Superconductors and Metals as Conductors for Metamaterials and Plasmonics", Nature Photonics, vol. 6, Mar. 4, 2012, pp. 259-264.

Imura et al., "Anomalous Light Transmission from Plasmonic-Capped Nanoapertures", Nano Letters, vol. 11, 2011, pp. 960-965.

* cited by examiner

F I G. 1 0
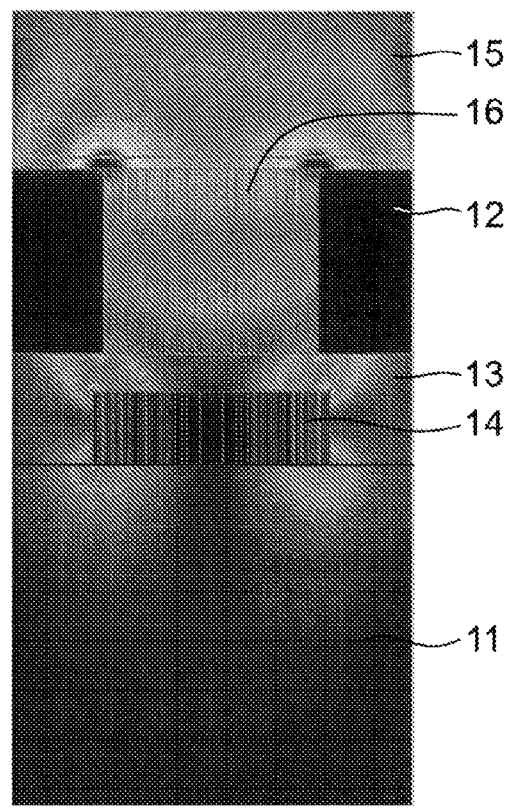
F I G. 1 1
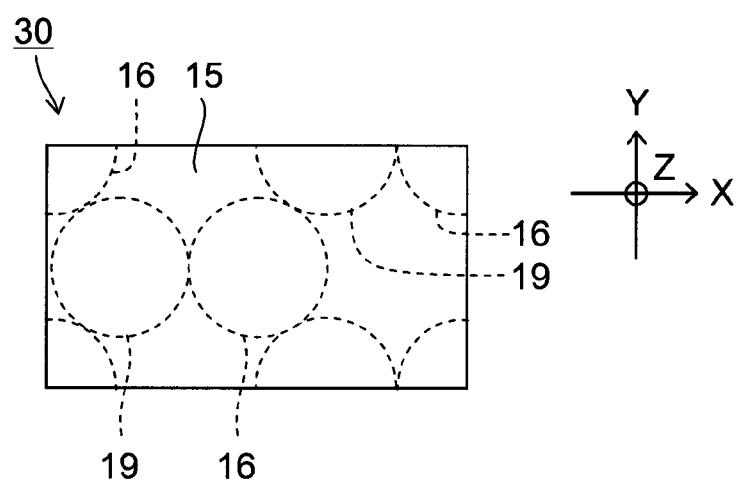

F I G. 1 8
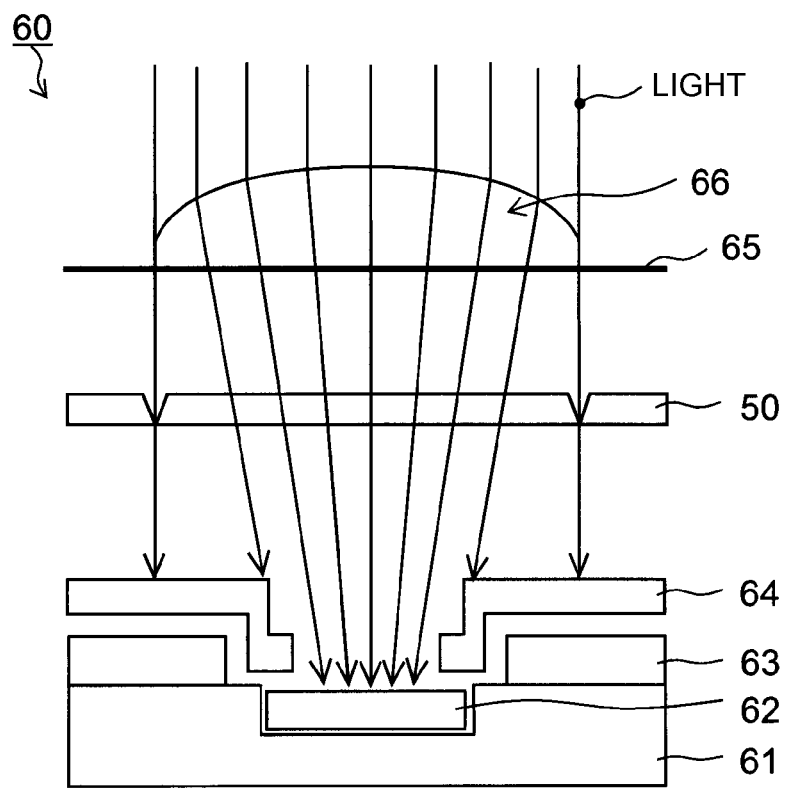

OPTICAL FILTER CONFIGURED TO TRANSMIT LIGHT OF A PREDETERMINED WAVELENGTH

BACKGROUND

Field

The present disclosure relates to an optical filter configured to transmit light of a predetermined wavelength.

Description of the Related Art

In these years, an optical filter has come to be known in which apertures are periodically arranged in a metal thin film so that light of a predetermined wavelength is mainly transmitted (refer to Japanese Patent No. 3008931). Bethe's theory of diffraction has been used to explain a phenomenon occurring upon light irradiation of a conductive thin film having sub-wavelength apertures. However, such a conductive thin film can transmit light of a predetermined wavelength that is larger than the diameter of the apertures. Accordingly, the transmittance of the conductive thin film is more than expected on the basis of the total area of the apertures formed therein. When the conductive thin film transmits light of a predetermined wavelength in accordance with the period of the apertures, plural transmission sub-peaks are observed on the short-wavelength side of the maximum transmission peak. Light at the maximum transmission peak (main peak) is light propagated by an abnormal transmission phenomenon caused by surface plasmons. Other light at the transmission subpeaks is light propagating through apertures (cylindrical waveguides). Thus, the conductive thin film transmits light of the predetermined wavelength and also light of other wavelengths. The wavelength selectivity of such an optical filter needs to be enhanced.

The surface plasmons upon irradiation of the conductive thin film with incident light occur in the surface of the conductive thin film. The frequency of the surface plasmons depends on the period of the apertures. A continuous surface (through hole) needs to extend from the Incident surface to the output surface in order to propagate surface plasmons. The surface plasmons on the output-surface side are output by energy diffraction of near-field light caused on the aperture end. Thus, the electric field distribution has high intensity on the aperture end.

The other propagation light (sometimes referred to as waveguide mode) passing through each aperture considered as a waveguide reflects off the inner wall of the aperture to propagate in the center of the aperture. Accordingly, the electric field has the highest intensity in the center of the cylindrical aperture. On the basis of such a phenomenon, a technique for enhancing wavelength selectivity has been proposed in which a second conductive thin film is disposed inside the aperture so that waveguide mode light is not transmitted (refer to Japanese Unexamined Patent Application Publication No. 2010-160212).

A laminated filter has also been proposed in which the first and second conductive thin layers patterned identically are laminated with such an interlayer distance therebetween that no optical near-field interaction occurs. This laminated filter transmits light within a narrow band, compared with a monolayer filter (refer to Japanese Patent No. 4995231).

In the above-described optical filters in Japanese Unexamined Patent Application Publication No. 2010-160212 and Japanese Patent No. 4995231, the half width needs to be narrowed for practical use to achieve high wavelength selectively. In addition, when such an optical filter is produced so as to transmit visible light for application to, for example, an image-pickup element, the diameter of the apertures needs to be decreased to about half of that in Examples of Japanese Unexamined Patent Application Publication No. 2010-160212. In this case, it becomes difficult to form the second conductive thin films inside the apertures.

SUMMARY

The present disclosure can provide an optical filter having practically high wavelength selectivity.

An optical filter configured to transmit light of a predetermined wavelength includes a substrate; a first conductive thin film that is disposed on the substrate and has apertures extending through the first conductive thin film and arranged with a period of less than the predetermined wavelength; and a second conductive thin film at least a portion of which faces the apertures so as to be separated from the apertures.

BRIEF DESCRIPTION OF THE DRAWINGS

FIG. 10 illustrates a field intensity distribution image of a section of the optical filter of the second embodiment at a wavelength of 545 nm.

FIG. 11 is a perspective plan view of a portion of an optical filter according to a third embodiment.

FIG. 18 is a partial sectional view of the spectral image-pickup element in FIG. 17.

DESCRIPTION OF THE EMBODIMENTS

Figure 1:
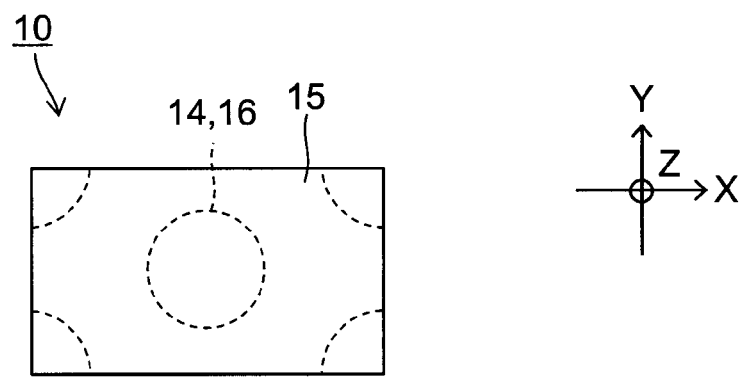
FIG. 1 is a perspective plan view of a portion of an optical filter according to a first embodiment.

Hereinafter, embodiments will be described with reference to drawings. Like reference numerals are used to denote like elements in the embodiments and redundant explanations are omitted. Where possible, features of the embodiments may be appropriately combined.

First Embodiment

Figure 2:
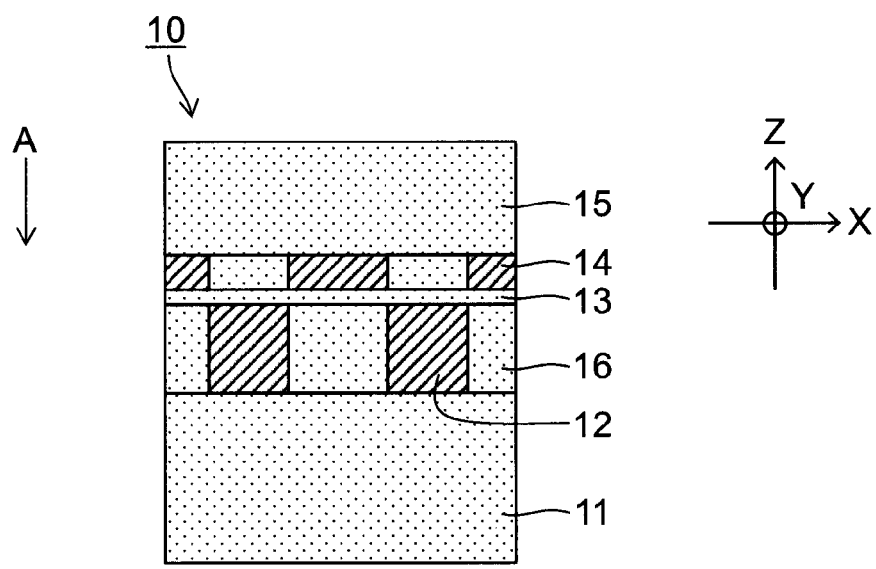
FIG. 2 is a perspective front view of the portion in FIG. 1.

FIG. 1 is a perspective plan view of a portion of an optical filter according to a first embodiment. FIG. 2 is a perspective front view of the portion in FIG. 1. In FIG. 2, arrow A represents the incident direction of light. An optical filter 10 has a configuration in which a first conductive thin film 12, a first dielectric 13, a second conductive thin film 14, and a second dielectric 15 are sequentially stacked on a substrate 11.

The material of the substrate 11 is not particularly limited as long as it transmits incident light. The material may be selected from inorganic materials, organic materials, and mixed materials of the foregoing. The substrate 11 may be formed of, for example, glass, quartz, Si, or a compound semiconductor. The substrate 11 is also not particularly limited in terms of size and thickness. The substrate 11 is also not particularly limited in terms of surface shape and may have a flat surface or a curved surface.

In order to provide high adhesion to a layer that is to be formed on the substrate 11, the substrate 11 may be appropriately surface-treated before the layer is formed thereon. Such a layer may be formed after a transparent material having high etching resistance is deposited as a stopper layer on the substrate 11.

An electrically conductive material of the first conductive thin film 12 can be freely selected. The term "electrically conductive material" denotes a material that contains a metal element, itself serves as a conductor, has a reflectivity of 70% or more in a desired wavelength region, and is solid at room temperature; or a material formed of an alloy of the metal element. The material of the first conductive thin film 12 may have a plasma frequency that is higher than the frequency of the target light. It is desired that the material be less likely to absorb light in the wavelength region of the target light. For example, the material may include a metal or an alloy of the metal, the metal being selected from the group consisting of aluminum, copper, silver, gold, titanium nitride, zirconium nitride, nickel, and cobalt; or may include a metal oxide transparent conductive material selected from the group consisting of $In_2O_3$-based materials including ITO (Sn:$In_2O_3$), ZnO-based materials including AZO (Al:ZnO), GZO (Ga:ZnO), BZO (B:ZnO), and IZO (In:ZnO), and IGZO-based materials (refer to Alexandra B. etc., SCIENCE, Vol. 331, No. 6015, pp. 290-291 (2011) and Phili T. etc., Nature Photonics, Vol. 6, pp. 259-264 (2012)).

The material of the first conductive thin film 12 is not limited to these examples as long as it is an electrically conductive material having a plasma frequency that is higher than the frequency of the target light. The first conductive thin film 12 may be sintered by a heat treatment. A protective film or the like may be formed on the first conductive thin film 12. The first conductive thin film 12 may have a thickness of 50 nm or more and 200 nm or less.

The first conductive thin film 12 has apertures 16 that are holes extending through the first conductive thin film 12 in the Z direction (from the substrate 11 side to the first dielectric 13 side) and arranged with a period of less than a predetermined wavelength. The predetermined wavelength is less than the wavelength of incident light. For example, the apertures 16 may be arranged with a period of 150 nm or more and 5000 nm or less. In FIGS. 1 and 2, the apertures 16 have a cylindrical shape. However, the shape of the apertures 16 is not particularly limited and may be, for example, a cone, a triangular pyramid, or a quadrangular pyramid. The apertures 16 are filled with the first dielectric 13.

Thus, the apertures 16 are arranged such that incident light of a predetermined wavelength induces surface plasmons in the surface of the first conductive thin film 12, so that the surface plasmons and the incident light resonantly interact with each other to thereby enhance the wavelength selectivity for transmitted light and intensify transmitted light.

The first dielectric 13 may be formed of a single dielectric material. Examples of such a material include silicon oxide, silicon nitride, titanium oxide, and aluminum oxide. The first dielectric 13 may have a thickness (except for portions filling the apertures 16) of 10 nm or more and 100 nm or less.

The second conductive thin film 14 is formed so as to face the apertures 16. In FIG. 1, in plan view, the second conductive thin film 14 is patterned so as to have circular parts having the same shape and size as the apertures 16. These circular parts are arranged in the same manner as the apertures 16 so as to face the apertures 16. That is, the cylindrical parts of the second conductive thin film 14 are arranged with the same period as the apertures 16. The patterned gaps in the second conductive thin film 14 are filled with the second dielectric 15.

In the first embodiment, circular holes serving as the apertures 16 and disc-shaped parts serving as the second conductive thin film 14 are arranged in a triangular grid pattern. However, the arrangement pattern is not particularly limited and, for example, a square grid arrangement may be employed. The triangular grid arrangement allows reduction of the dependence on incident polarization light and improvement in terms of oblique incidence. The planar shape of the apertures 16 and the parts of the second conductive thin film 14 is not limited to a circle and may be another shape such as a square or a regular polygon.

Incident light induces surface plasmons in the surface of the second conductive thin film 14; the surface plasmons and the incident light resonantly interact with each other; the peripheries of the parts of the second conductive thin film 14 and the peripheries of the apertures 16 in the first conductive thin film 12 affect each other by near-field interaction (refer to Kohei I. etc., Nano Letter, Vol. 11, pp. 960-965 (2011)); surface plasmons are induced in the surface of the first conductive thin film 12 and resonance due to the periodic pattern of the apertures 16 of the first conductive thin film 12 allows output at a predetermined wavelength. Thus, the second conductive thin film 14 and the first conductive thin film 12 may be disposed with such an interlayer distance therebetween that they affect each other by optical near-field interaction.

The second conductive thin film 14 is formed such that at least a portion of the second conductive thin film 14 faces the apertures 16 so as to be separated from the apertures 16. Such a configuration of "at least a portion of the second conductive thin film 14 faces the apertures 16" includes a case where, in plan view, the second conductive thin film 14 partially overlaps the apertures 16. For example, parts of the second conductive thin film 14 may face the apertures 16 so as to be slightly displaced from the apertures 16 or may overlap the apertures 16 in plan view. The parts of the second conductive thin film 14 do not necessarily have the same shape and size as the apertures 16; the parts may have a shape different from that of the apertures 16 or the parts may have dimensions different from those of the apertures 16. Thus, an optical filter can be designed such that, even when variations in processes in terms of alignment or the like in photolithography result in slight displacement between the pattern of the apertures 16 and the pattern of the second conductive thin film 14, problems are not caused.

An electrically conductive material of the second conductive thin film 14 can be freely selected as for the first conductive thin film 12. The first and second conductive thin films 12 and 14 are not necessarily formed of the same material. The second conductive thin film 14 may be sintered by a heat treatment. A protective film or the like may be formed on the second conductive thin film 14. The second conductive thin film 14 may have a thickness of 30 nm or more and 100 nm or less.

The material of the second dielectric 15 and a material that fills the apertures 16 may be similar to the material of the first dielectric 13 and may be the same as the material of the first dielectric 13. Such use of the same material allows suppression of reflection at interfaces and enhancement of selectivity of transmitted wavelength.

The optical filter 10 can be produced by a microprocessing technique such as photolithography, electron beam lithography, or nanoimprint lithography. The processes of forming holes (formation of the apertures 16 and patterning of the second conductive thin film 14) are performed layer by layer so as to form desired holes at predetermined positions.

The optical filter 10 may be produced, for example, in the following manner. The first conductive thin film 12 is formed on the substrate 11. The apertures 16 are then formed in the first conductive thin film 12 by photolithography and etching. This etching may be performed under dry etching conditions allowing highly anisotropic etching, so that problems such as side etching of the inner walls of the apertures 16 are avoided. Subsequently, the first dielectric 13 is formed on the first conductive thin film 12 so as to fill the apertures 16. The first dielectric 13 is planarized by a chemical or physical planarization technique. The second conductive thin film 14 is then formed on the first dielectric 13 and patterned by photolithography and etching. The second dielectric 15 is subsequently formed on the second conductive thin film 14 so as to fill the patterned gaps of the second conductive thin film 14. Thus, the optical filter 10 is provided.

A sample of the optical filter 10 of the first embodiment and a sample (comparative example) of an optical filter not including the second conductive thin film were prepared and evaluated in terms of properties. The optical filter 10 of the first embodiment included the substrate 11 formed of $SiO_2$; the first conductive thin film 12 formed of Al and having a thickness of 150 nm; the first dielectric 13 formed of $SiO_2$ and having a thickness of 40 nm; the second conductive thin film 14 formed of Al and having a thickness of 60 nm; and the second dielectric 15 formed of $SiO_2$. As illustrated in FIGS. 1 and 2, the apertures 16 and parts of the second conductive thin film 14 were formed so as to have the same circular shape and size in plan view, have a diameter of 210 nm, and be identically arranged with a period of 360 nm. The other optical filter (comparative example) was the same as the optical filter 10 except that the second conductive thin film 14 was not formed.

Figure 3:
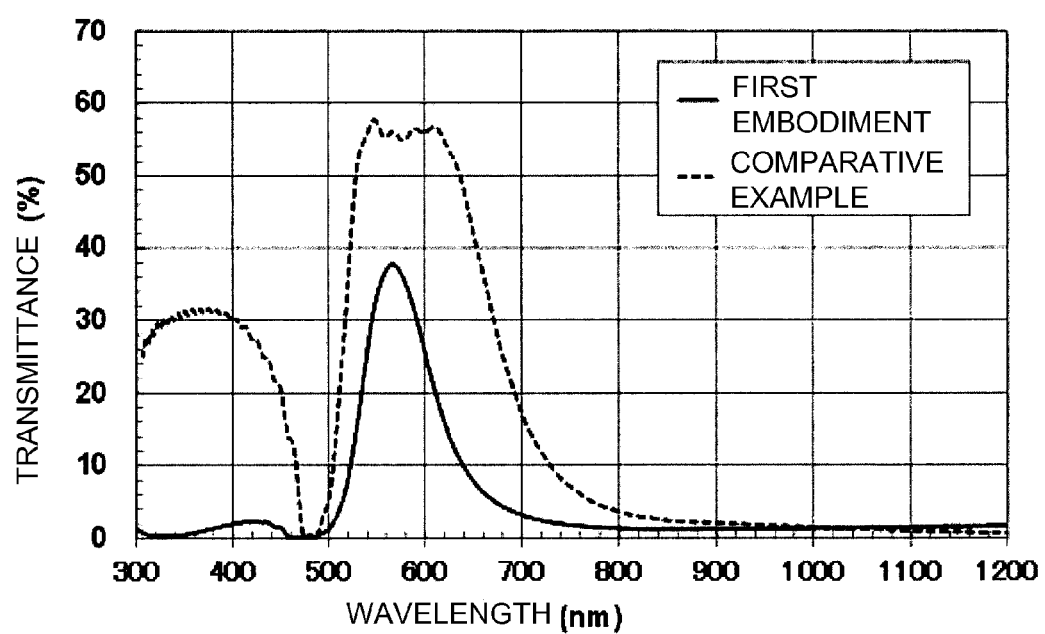
FIG. 3 illustrates the measurement results of optical filters of the first embodiment and comparative example in terms of transmittance.
Figure 4A:
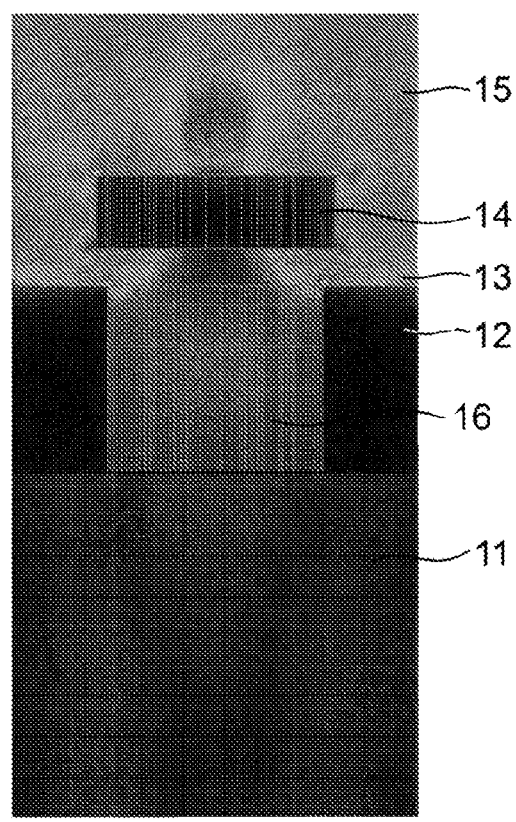
FIG. 4A illustrates a field intensity distribution image of a section of the optical filter of the first embodiment at a wavelength of 400 nm.
Figure 4B:
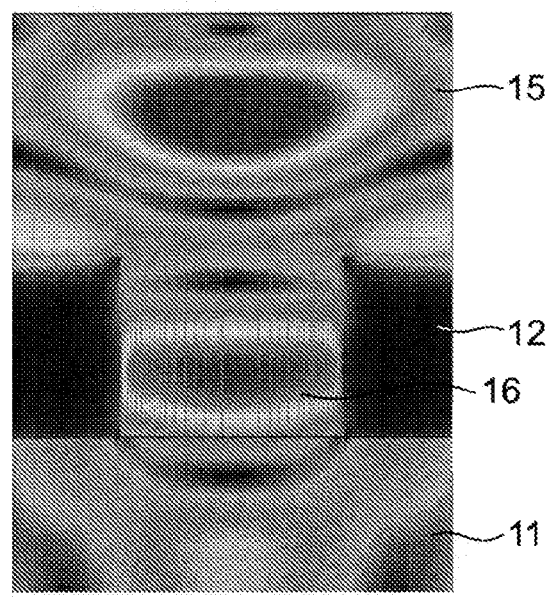
FIG. 4B illustrates a field intensity distribution image of a section of the optical filter of the comparative example at a wavelength of 400 nm.
Figure 5A:
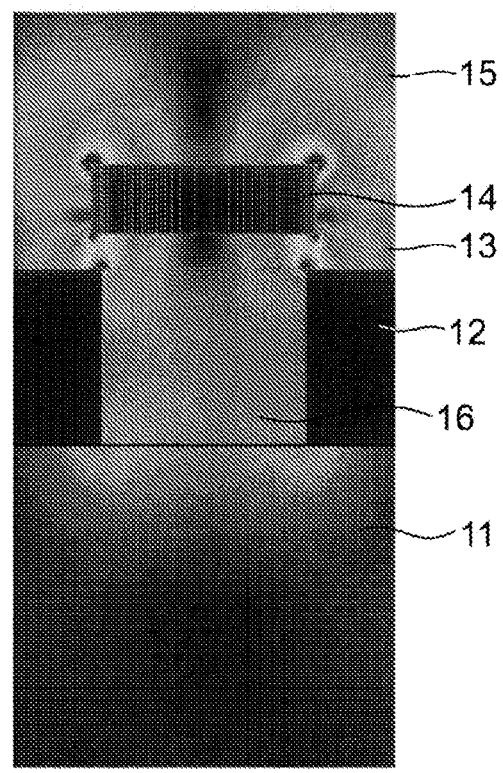
FIG. 5A illustrates a field intensity distribution image of a section of the optical filter of the first embodiment at a wavelength of 545 nm.
Figure 5B:
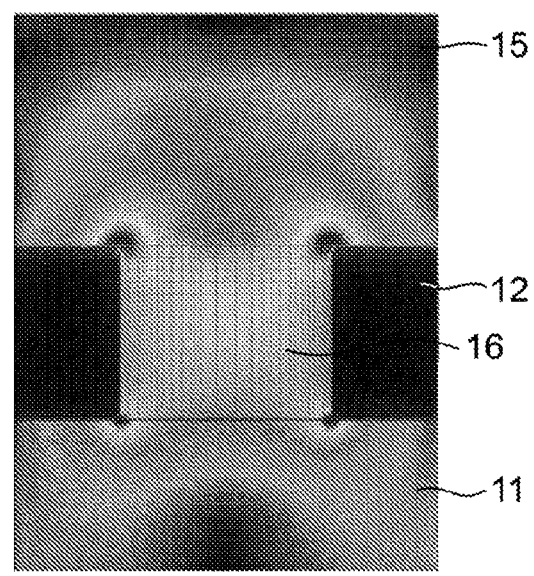
FIG. 5B illustrates a field intensity distribution image of a section of the optical filter of the comparative example at a wavelength of 545 nm.

FIG. 3 illustrates the measurement results of optical filters of the first embodiment and comparative example in terms of transmittance. FIG. 4A illustrates a field intensity distribution image of a section of the optical filter of the first embodiment at a wavelength of 400 nm. FIG. 4B illustrates a field intensity distribution image of a section of the optical filter of the comparative example at a wavelength of 400 nm. FIG. 5A illustrates a field intensity distribution image of a section of the optical filter of the first embodiment at a wavelength of 545 nm. FIG. 5B illustrates a field intensity distribution image of a section of the optical filter of the comparative example at a wavelength of 545 nm.

Referring to FIG. 4B illustrating the optical filter of the comparative example, a waveguide mode is observed in which the field intensity becomes the highest in the center of the cylinder of the aperture 16. In contrast, referring to FIG. 4A illustrating the optical filter of the first embodiment, the waveguide mode is substantially not observed.

Referring to FIG. 3, the transmitted light in the optical filter of the first embodiment has a main peak having a small half width at about 545 nm, but substantially does not have subpeaks at about 400 nm. In contrast, the transmitted light in the optical filter of the comparative example has a main peak having a large half width at about 545 nm and also has a large number of subpeaks at about 400 nm. FIGS. 4A to 5B indicate that the wavelength selectivity of the optical filter of the first embodiment is achieved by the presence of the second conductive thin film 14.

In summary, the optical filter 10 of the first embodiment includes the second conductive thin film 14 at least a portion of which faces the apertures 16 so as to be separated from the apertures 16. As a result of this configuration, the optical filter has such practically high wavelength selectivity that transmitted light has a main peak having a small half width and substantially does not have subpeaks.

Second Embodiment

Figure 6:
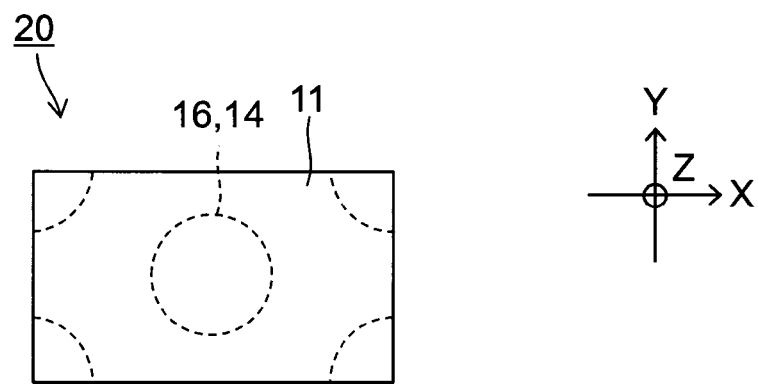
FIG. 6 is a perspective plan view of a portion of an optical filter according to a second embodiment.
Figure 7:
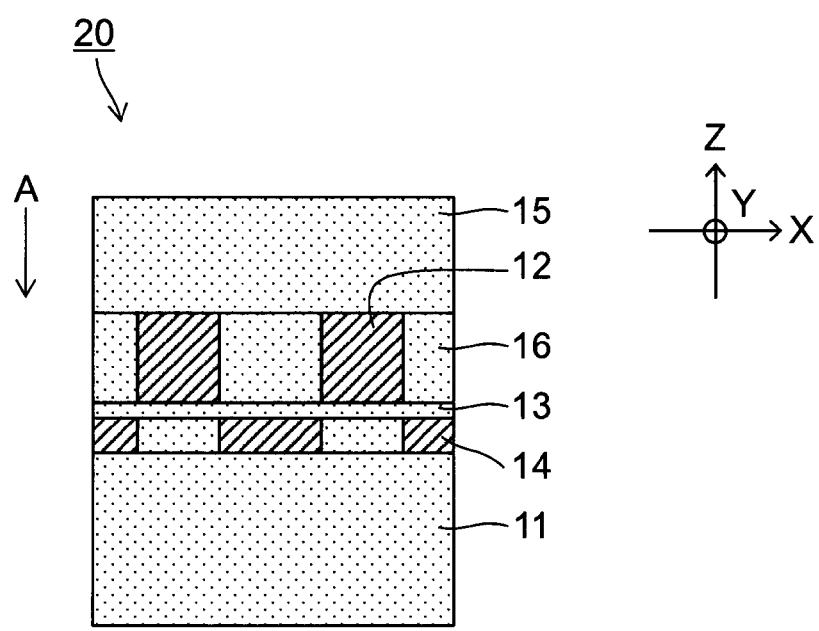
FIG. 7 is a perspective front view of the portion in FIG. 6.

FIG. 6 is a perspective plan view of a portion of an optical filter according to a second embodiment. FIG. 7 is a perspective front view of the portion in FIG. 6. In FIG. 7, arrow A represents the incident direction of light. An optical filter 20 has a configuration in which a second conductive thin film 14, a first dielectric 13, a first conductive thin film 12, and a second dielectric 15 are sequentially stacked on a substrate 11. That is, compared with the configuration of the first embodiment, the order of stacking the second conductive thin film 14, the first dielectric 13, and the first conductive thin film 12 is reversed. The patterns of apertures 16 and the second conductive thin film 14 are the same as in the first embodiment. The above-described layers are sequentially stacked on the substrate 11, so that the first dielectric 13 fills the patterned gaps in the second conductive thin film 14, and the second dielectric 15 fills the apertures 16.

Incident light induces surface plasmons in the surface of the first conductive thin film 12; the surface plasmons and the incident light resonantly interact with each other; the peripheries of the apertures 16 in the first conductive thin film 12 and the peripheries of parts of the second conductive thin film 14 affect each other by optical near-field interaction (refer to Kohei I. etc., Nano Letter, Vol. 11, pp. 960-965 (2011)); surface plasmons are induced in the surface of the second conductive thin film 14 and resonance due to the periodic pattern of the second conductive thin film 14 allows output at a predetermined wavelength. Thus, the first conductive thin film 12 and the second conductive thin film 14 may be disposed with such an interlayer distance therebetween that they affect each other by optical near-field interaction.

A sample of the optical filter 20 of the second embodiment and a sample (comparative example) of an optical filter not including the second conductive thin film were prepared and evaluated in terms of properties. The optical filter 20 of the second embodiment included the substrate 11 formed of $SiO_2$; the second conductive thin film 14 formed of Al and having a thickness of 40 nm; the first dielectric 13 formed of $SiO_2$ and having a thickness of 30 nm; the first conductive thin film 12 formed of Al and having a thickness of 150 nm; and the second dielectric 15 formed of $SiO_2$. As illustrated in FIGS. 6 and 7, the apertures 16 and parts of the second conductive thin film 14 were formed so as to have the same circular shape and size in plan view, have a diameter of 210 nm, and be identically arranged with a period of 360 nm. The other optical filter (comparative example) was the same sample as the optical filter (comparative example) in the first embodiment.

In the second embodiment, circular holes serving as the apertures 16 and disc-shaped parts serving as the second conductive thin film 14 are arranged in a triangular grid pattern. However, the arrangement pattern is not particularly limited and, for example, a square grid arrangement may be employed. The triangular grid arrangement allows reduction of the dependence on incident polarization light and improvement in terms of oblique incidence. The planar shape of the apertures 16 and the parts of the second conductive thin film 14 is not limited to a circle and may be another shape such as a square or a regular polygon.

Figure 8:
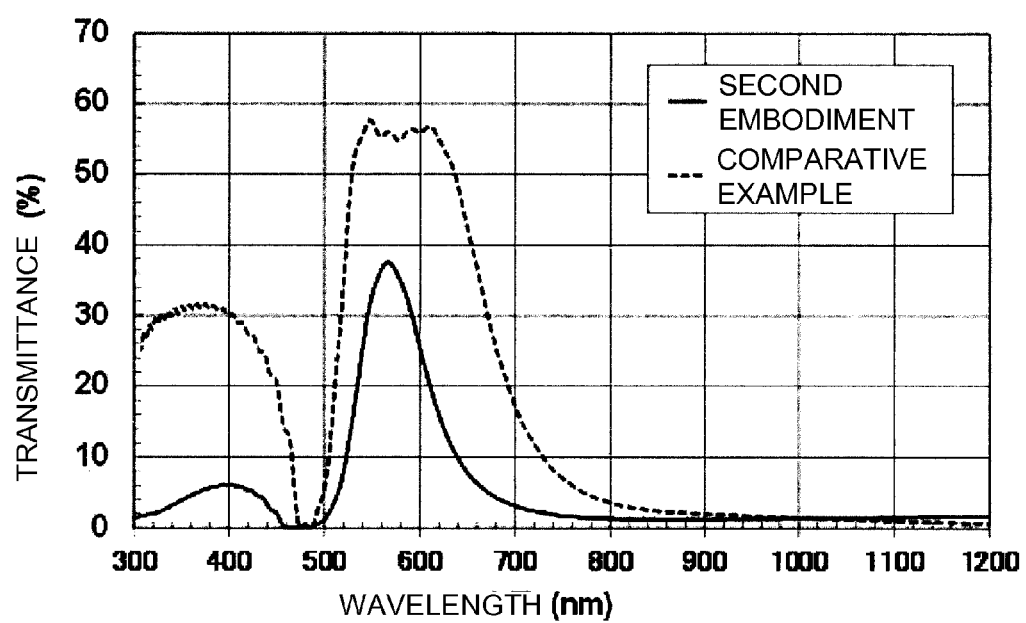
FIG. 8 illustrates the measurement results of optical filters of the second embodiment and comparative example in terms of transmittance.
Figure 9:
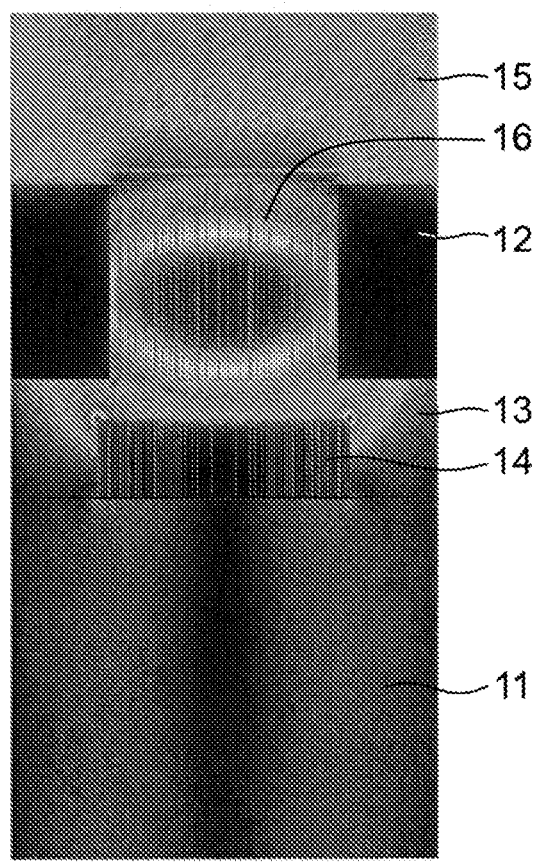
FIG. 9 illustrates a field intensity distribution image of a section of the optical filter of the second embodiment at a wavelength of 400 nm.

FIG. 8 illustrates the measurement results of optical filters of the second embodiment and comparative example in terms of transmittance. FIG. 9 illustrates a field intensity distribution image of a section of the optical filter of the second embodiment at a wavelength of 400 nm. FIG. 10 illustrates a field intensity distribution image of a section of the optical filter of the second embodiment at a wavelength of 545 nm. The field intensity distribution images of sections of the optical filter of the comparative example at wavelengths of 400 nm and 545 nm are the same as in FIGS. 4B and 5B and are omitted.

Regarding the optical filter of the comparative example, propagation light of waveguide mode is observed in which the field intensity becomes the highest in the center of the cylinder of the aperture 16. In contrast, referring to FIG. 9 illustrating the optical filter of the second embodiment, propagation light of waveguide mode is substantially not observed because of the presence of the second conductive thin film 14.

Referring to FIG. 8, the transmitted light in the optical filter of the second embodiment has a main peak having a small half width at about 545 nm, but substantially does not have subpeaks at about 400 nm. In contrast, the transmitted light in the optical filter of the comparative example has a main peak having a large half width at about 545 nm and also has a large number of subpeaks at about 400 nm. As illustrated in FIGS. 9 and 10, the wavelength selectivity of the optical filter of the second embodiment is achieved by the presence of the second conductive thin film 14.

In summary, the optical filter 20 of the second embodiment includes the second conductive thin film 14 at least a portion of which faces the apertures 16 so as to be separated from the apertures 16. As a result of this configuration, the optical filter has such practically high wavelength selectivity that transmitted light has a main peak having a small half width and substantially does not have subpeaks.

Third Embodiment

Figure 12:
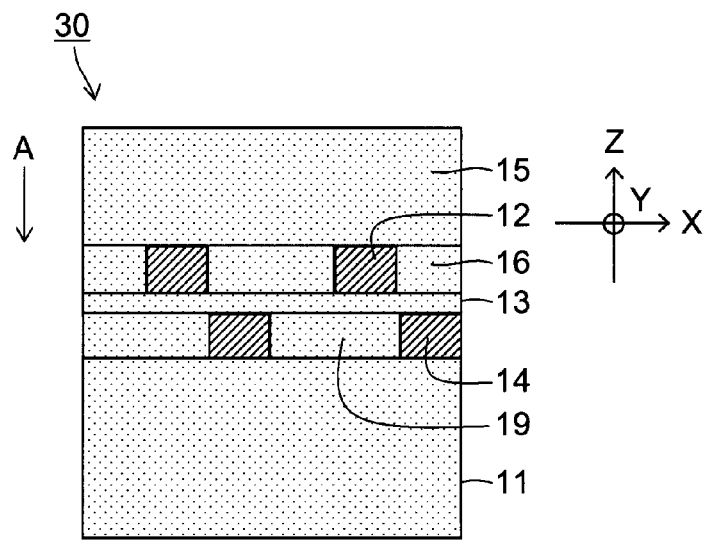
FIG. 12 is a perspective front view of the portion in FIG. 11.

FIG. 11 is a perspective plan view of a portion of an optical filter according to a third embodiment. FIG. 12 is a perspective front view of the portion in FIG. 11. In FIG. 12, arrow A represents the incident direction of light. An optical filter 30 has a configuration in which a second conductive thin film 14, a first dielectric 13, a first conductive thin film 12, and a second dielectric 15 are sequentially stacked on a substrate 11. That is, the order of stacking these layers is the same as in the second embodiment.

The shape, size, and period of the patterns of apertures 16 and apertures 19 are the same as in the first embodiment. However, the apertures 16 and the apertures 19 are arranged such that each aperture 16 is displaced from the corresponding aperture 19 by half of the period in the X direction. For example, FIGS. 11 and 12 illustrate a configuration in which, in plan view, the apertures 16 are in contact with the apertures 19. The above-described layers are sequentially stacked on the substrate 11, so that the first dielectric 13 fills the apertures 19, and the second dielectric 15 fills the apertures 16. The first conductive thin film 12 and the second conductive thin film 14 may have a thickness of 30 nm or more and 100 nm or less.

Incident light induces surface plasmons in the surface of the first conductive thin film 12; the surface plasmons and the incident light resonantly interact with each other; the peripheries of the apertures 16 in the first conductive thin film 12 and the peripheries of the apertures 19 in the second conductive thin film 14 affect each other by optical near-field interaction (refer to Kohei I. etc., Nano Letter, Vol. 11, pp. 960-965 (2011)); surface plasmons are induced in the surface of the second conductive thin film 14 and resonance due to the periodic pattern of the second conductive thin film 14 allows output at a predetermined wavelength. Thus, the first conductive thin film 12 and the second conductive thin film 14 may be disposed with such an interlayer distance therebetween that they affect each other by optical near-field interaction.

A sample of the optical filter 30 of the third embodiment and the same sample (comparative example) as in the first embodiment were prepared and evaluated. The optical filter 30 of the third embodiment included the substrate 11 formed of $SiO_2$; the second conductive thin film 14 formed of Al and having a thickness of 75 nm; the first dielectric 13 formed of $SiO_2$ and having a thickness of 40 nm; the first conductive thin film 12 formed of Al and having a thickness of 75 nm; and the second dielectric 15 formed of $SiO_2$. The apertures 16 and the apertures 19 have the same circular shapes having a diameter of 210 nm in plan view and are arranged with a period of 360 nm such that each aperture 16 is displaced from the corresponding aperture 19 by half of the period in the X direction. In FIG. 11, each aperture 16 is displaced from the corresponding aperture 19 by half of the period in the X direction. However, the displacement direction and amount are not particularly limited. For example, each aperture 16 may be displaced from the corresponding aperture 19 in the Y direction by half or quarter of the period.

In the third embodiment, the apertures 16 and 19 that are circular holes are arranged in a triangular grid pattern. However, the arrangement pattern is not particularly limited and, for example, a square grid arrangement may be employed. The triangular grid arrangement allows reduction of the dependence on incident polarization light and improvement in terms of oblique incidence. The planar shape of the apertures 16 and 19 is not limited to a circle and may be another shape such as a square or a regular polygon.

Figure 13:
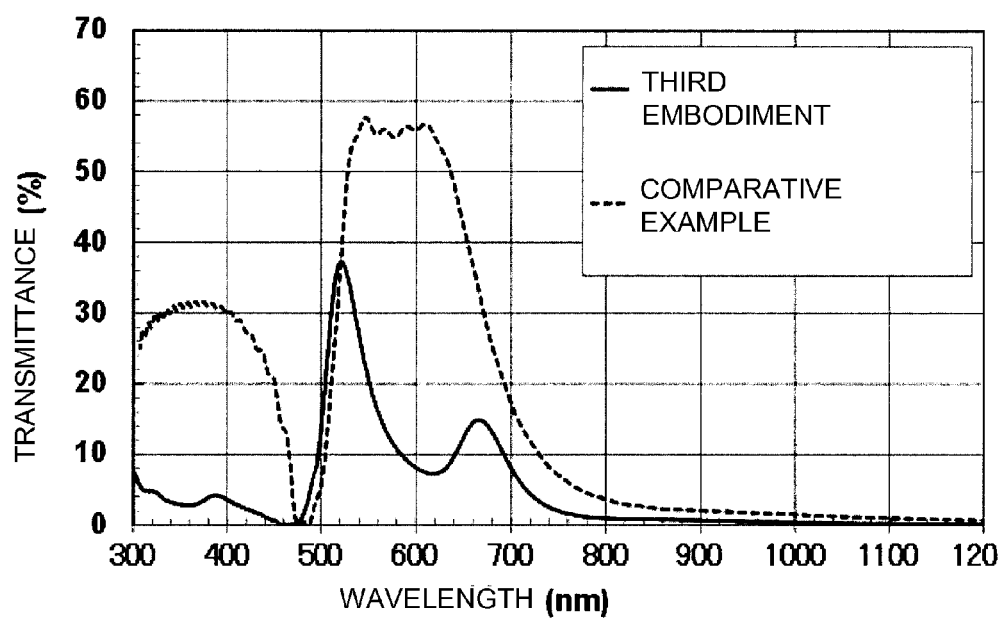
FIG. 13 illustrates the measurement results of optical filters of the third embodiment and comparative example in terms of transmittance.

FIG. 13 illustrates the measurement results of optical filters of the third embodiment and comparative example in terms of transmittance. Referring to FIG. 13, the transmitted light in the optical filter of the third embodiment has a main peak having a small half width at about 545 nm, but substantially does not have subpeaks at about 400 nm. In contrast, the transmitted light in the optical filter of the comparative example has a main peak having a large half width at about 545 nm and also has a large number of subpeaks at about 400 nm. The wavelength selectivity of the optical filter of the third embodiment is achieved by the presence of the second conductive thin film 14.

In summary, the optical filter 30 of the third embodiment includes the second conductive thin film 14 at least a portion of which faces the apertures 16 so as to be separated from the apertures 16. As a result of this configuration, the optical filter has such practically high wavelength selectivity that transmitted light has a main peak having a small half width and substantially does not have subpeaks.

Fourth Embodiment

Figure 14:
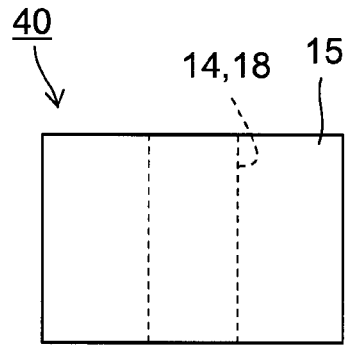
FIG. 14 is a perspective plan view of a portion of an optical filter according to a fourth embodiment.
Figure 15:
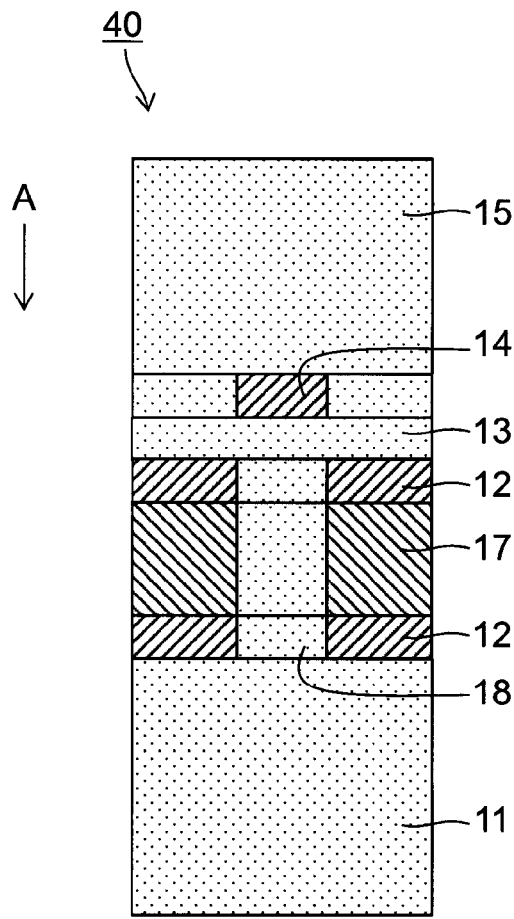
FIG. 15 is a perspective front view of the portion in FIG. 14.

FIG. 14 is a perspective plan view of a portion of an optical filter according to a fourth embodiment. FIG. 15 is a perspective front view of the portion in FIG. 14. In FIG. 15, arrow A represents the incident direction of light. An optical filter 40 has a configuration in which a first conductive thin film 12, a third dielectric 17, a first conductive thin film 12, a first dielectric 13, a second conductive thin film 14, and a second dielectric 15 are sequentially stacked on a substrate 11. This configuration is different from that of the first embodiment in that the first conductive thin films 12 may have a thickness of 10 nm or more and 100 nm or less.

A multilayer film in which the first conductive thin film 12, the third dielectric 17, and the first conductive thin film 12 are stacked has apertures 18 (slits) that extend through the multilayer film in the Z direction (from the substrate 11 side to the first dielectric 13 side) and are arranged with a period of less than a predetermined wavelength. The predetermined wavelength is less than the wavelength of incident light. For example, the ratio of the width of apertures 18 to the arrangement period of apertures 18 may be 0.2 or more and 0.6 or less. The apertures 18 are filled with the first dielectric 13.

The first dielectric 13 may be formed of a single dielectric material. Examples of such a material include silicon oxide, silicon nitride, titanium oxide, and aluminum oxide. The first dielectric 13 may have a thickness (except for portions filling the apertures 18) of 10 nm or more and 100 nm or less.

The second conductive thin film 14 is formed so as to face the apertures 18. In FIG. 14, in plan view, the second conductive thin film 14 is patterned so as to have strip parts having the same shape and size as the slit-shaped apertures 18. These strip parts are arranged in the same manner as the apertures 18 so as to face the apertures 18. That is, the rectangular parallelepiped parts of the second conductive thin film 14 are arranged with the same period as the apertures 18. The patterned gaps in the second conductive thin film 14 are filled with the second dielectric 15.

The second conductive thin film 14 is formed such that at least a portion of the second conductive thin film 14 faces the apertures 18 so as to be separated from the apertures 18. Such a configuration of "at least a portion of the second conductive thin film 14 faces the apertures 18" includes a case where, in plan view, the second conductive thin film 14 partially overlaps the apertures 18. For example, parts of the second conductive thin film 14 may face the apertures 18 so as to be slightly displaced from the apertures 18 or may overlap the apertures 18 in plan view. The parts of the second conductive thin film 14 do not necessarily have the same shape and size as the apertures 18; the parts may have a shape different from that of the apertures 18 or the parts may have dimensions different from those of the apertures 18. Thus, an optical filter can be designed such that, even when variations in processes in terms of alignment or the like in photolithography result in slight displacement between the pattern of the apertures 18 and the pattern of the second conductive thin film 14, problems are not caused.

An electrically conductive material of the second conductive thin film 14 can be freely selected as for the first conductive thin film 12. The first and second conductive thin films 12 and 14 are not necessarily formed of the same material. The second conductive thin film 14 may be sintered by a heat treatment. A protective film or the like may be formed on the second conductive thin film 14. The second conductive thin film 14 may have a thickness of 30 nm or more and 100 nm or less.

The material of the second dielectric 15 may be similar to the material of the first dielectric 13 and may be the same as the material of the first dielectric 13.

The third dielectric 17 may be formed of a material having a higher refractive index than the first dielectric 13 and the second dielectric 15. Examples of such a material include silicon oxide, silicon nitride, titanium oxide, and aluminum oxide. The third dielectric 17 may have a thickness of 50 nm or more and 150 nm or less.

The optical filter 40 can be produced by a microprocessing technique such as photolithography, electron beam lithography, or nanoimprint lithography. The processes of forming holes (formation of the apertures 18 and patterning of the second conductive thin film 14) may be performed layer by layer so as to form desired holes at predetermined positions.

The optical filter 40 may be produced, for example, in the following manner. The first conductive thin film 12 is formed on the substrate 11. Subsequently, the third dielectric 17 and another first conductive thin film 12 are sequentially formed on the first conductive thin film 12. The apertures 18 are then formed by photolithography and etching. This etching may be performed under dry etching conditions allowing highly anisotropic etching, so that problems such as side etching of the inner walls of the apertures 18 are avoided. The first dielectric 13 is then formed on the first conductive thin film 12 so as to fill the apertures 18. The first dielectric 13 is planarized by a chemical or physical planarization technique. The second conductive thin film 14 is then formed on the first dielectric 13 and patterned by photolithography and etching. The second dielectric 15 is subsequently formed on the second conductive thin film 14 so as to fill the patterned gaps of the second conductive thin film 14. Thus, the optical filter 40 is provided.

A sample of the optical filter 40 of the fourth embodiment and a sample (comparative example) of an optical filter not including the second conductive thin film were prepared and evaluated in terms of properties. The optical filter 40 of the fourth embodiment included the substrate 11 formed of $SiO_2$; the first conductive thin film 12 formed of Al and having a thickness of 40 nm; the third dielectric 17 formed of silicon nitride and having a thickness of 100 nm; the first conductive thin film 12 formed of Al and having a thickness of 40 nm; the first dielectric 13 formed of $SiO_2$ and having a thickness of 40 nm; the second conductive thin film 14 formed of Al and having a thickness of 30 nm; and the second dielectric 15 formed of $SiO_2$. As illustrated in FIGS. 14 and 15, the apertures 18 and parts of the second conductive thin film 14 were formed so as to have the same strip shape and size in plan view, have a width of 90 nm, and be identically arranged with a period of 300 nm. The other optical filter (comparative example) was the same as the optical filter 40 except that the second conductive thin film 14 was not formed.

Figure 16:
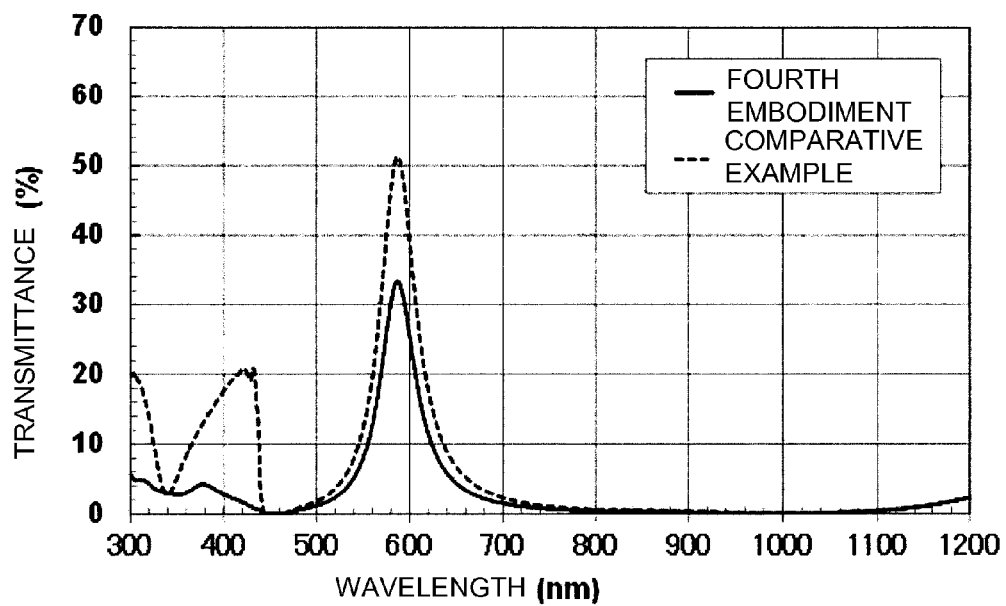
FIG. 16 illustrates the measurement results of optical filters of the fourth embodiment and comparative example in terms of transmittance.

FIG. 16 illustrates the measurement results of optical filters of the fourth embodiment and comparative example in terms of transmittance. The transmitted light in the optical filter of the fourth embodiment has a main peak having a small half width at about 580 nm, but substantially does not have subpeaks at about 400 nm. Compared with the fourth embodiment, the transmitted light in the optical filter of the comparative example has a main peak having a large half width at about 580 nm and also has a large number of subpeaks at about 400 nm. The wavelength selectivity of the optical filter of the fourth embodiment is achieved by the presence of the second conductive thin film 14. Similar results were also obtained in the case where the ratio of the width of apertures 18 to the arrangement period of apertures 18 is 0.2 or more and 0.6 or less.

In summary, the optical filter 40 of the fourth embodiment includes the second conductive thin film 14 at least a portion of which faces the apertures 18 so as to be separated from the apertures 18. As a result of this configuration, the optical filter has such practically high wavelength selectivity that transmitted light has a main peak having a small half width and substantially does not have subpeaks.

In the first to third embodiments, the apertures were formed as holes. In the fourth embodiment, the apertures were formed as slits. However, the configuration of the apertures is not limited to these examples. For example, a configuration in which holes and slits are formed as apertures may be employed. A configuration in which the apertures have different sizes can also provide the advantages of embodiments. In such a case where the apertures have different sizes, the average of these sizes can be used to represent the size of the apertures.

Fifth Embodiment

Figure 17:
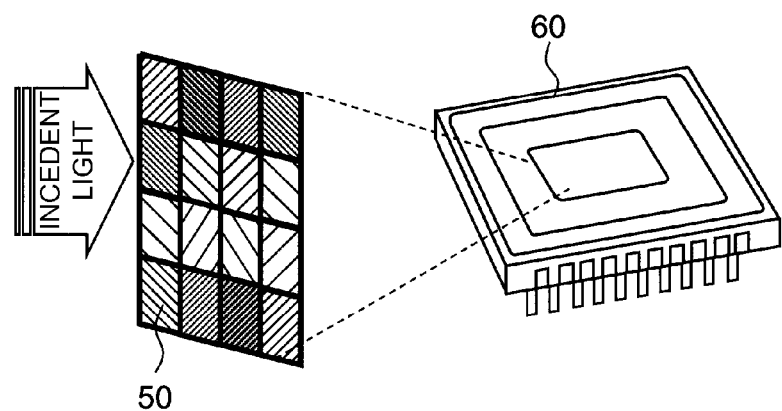
FIG. 17 illustrates a perspective view and a partial enlarged view of a spectral image-pickup element according to a fifth embodiment.

A spectral image-pickup element including a spectral unit can be obtained by producing optical filters that transmit light of visible-light wavelengths according to one of the first to fourth embodiments and by attaching these optical filters on the pixels of an image-pickup element. FIG. 17 illustrates a perspective view of a spectral image-pickup element 60 and a partial enlarged view thereof that shows plural optical filters 50 attached on the spectral image-pickup element 60.

FIG. 18 is a partial sectional view of the spectral image-pickup element 60. The spectral image-pickup element 60 includes, on a silicon substrate 61, a light-receiving element 62, an electrode 63, a light-shielding film 64, an optical filter 50, a planarization layer 65, and a micro lens 66. By attaching such optical filters 50 instead of conventional color filters, a spectral image-pickup element 60 including pixels having different absorption wavelengths can be obtained. Pixels can be thus made to have different absorption wavelengths by adjusting the periods of apertures of the optical filters 50.

Sixth Embodiment

Figure 19:
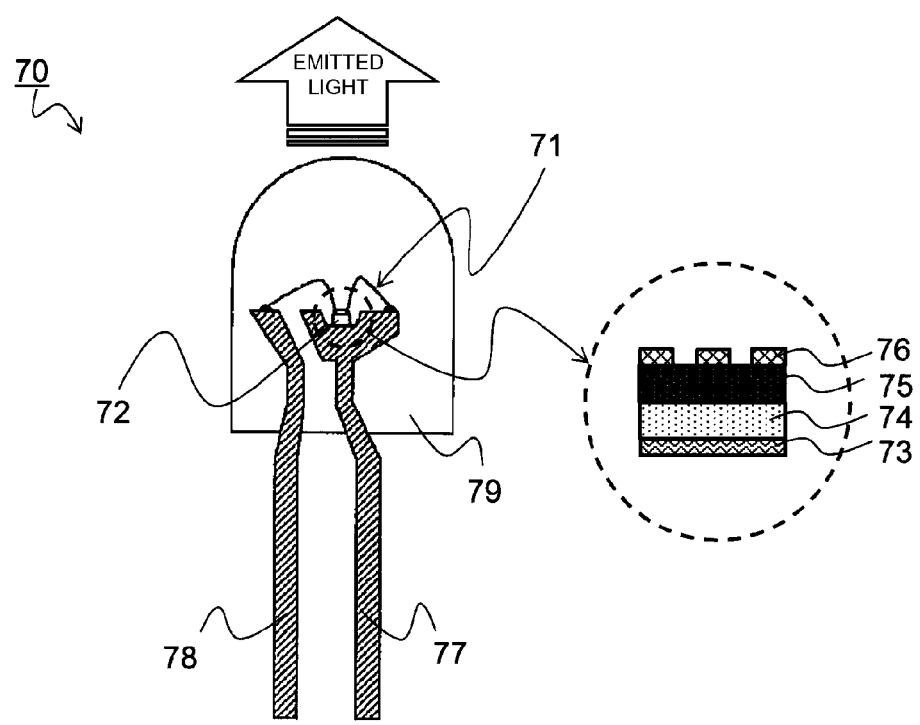
FIG. 19 is a partial sectional view of a light-emitting element according to a sixth embodiment.

A light-emitting element that emits light of desired wavelengths alone (light of the other wavelengths is selectively cut off) can be obtained by producing optical filters that transmit light of ultraviolet wavelengths according to one of the first to fourth embodiments and by attaching these optical filters on a light-emitting element. FIG. 19 is a partial sectional view of a light-emitting element 70. An LED (light-emitting diode) chip 72 is provided by sequentially stacking an electrode 73, an n-type semiconductor 74, and a p-type semiconductor 75, and by attaching optical filters 76 thereon that also function as an electrode of the LED chip 72. This LED chip 72 is mounted on a mount lead 77, connected to the mount lead 77 and an inner lead 78 through conductive wires 71, and sealed with a molding material 79.

Figure 20:
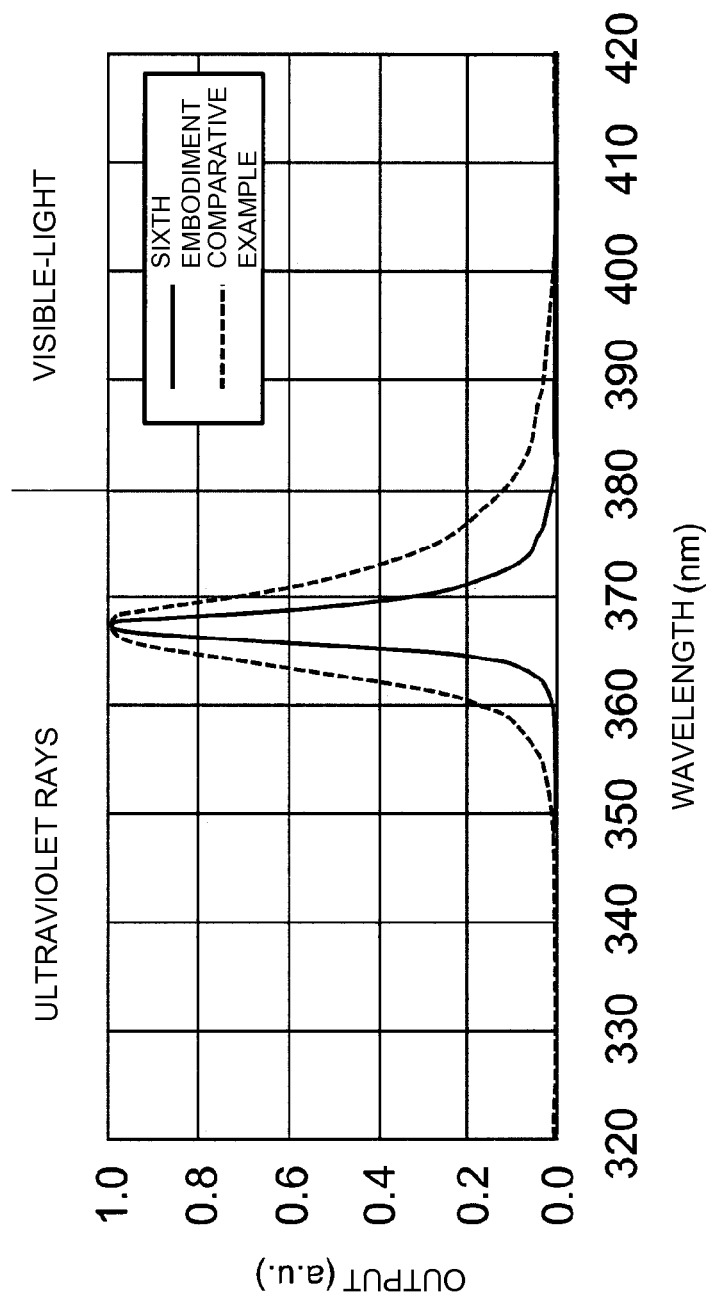
FIG. 20 illustrates emitted-light spectra of light-emitting elements of the sixth embodiment and comparative example.

FIG. 20 illustrates emitted-light spectra of the light-emitting element 70 of the sixth embodiment and a light-emitting element of comparative example. The light-emitting element of comparative example employs a standard electrode not having the function of the optical filters 76. Both of the light-emitting elements have a peak wavelength at about 368 nm, but the light-emitting element 70 of the sixth embodiment has a smaller half width. In the light-emitting element 70 of the sixth embodiment, visible-light components slightly contained in the emitted-light spectrum can be completely cut off. As a result, for example, when emitted light from the light-emitting element 70 is applied to an object that emits fluorescence upon exposure to ultraviolet rays, fluorescence from the object can be detected with higher accuracy.

Hereinafter, embodiments will be summarized. An optical filter 10 according to an embodiment is an optical filter 10 configured to transmit light of a predetermined wavelength, the optical filter 10 including a substrate 11; a first conductive thin film 12 that is disposed on the substrate 11 and has apertures 16 extending through the first conductive thin film 12 and arranged with a period of less than the predetermined wavelength; and a second conductive thin film 14 at least a portion of which faces the apertures 16 so as to be separated from the apertures 16.

This configuration includes the second conductive thin film 14. As a result, the optical filter has such practically high wavelength selectivity that transmitted light has a main peak having a small half width and substantially does not have subpeaks.

In the above-described optical filter, the apertures may be, for example, holes or slits.

In the above-described optical filter, the second conductive thin film may be patterned with the period of arrangement of the apertures. In this configuration, transmitted light has smaller subpeaks.

In the above-described optical filter, for example, the first conductive thin film and/or the second conductive thin film may contain a metal or an alloy of the metal, the metal being selected from the group consisting of aluminum, copper, silver, gold, titanium nitride, zirconium nitride, nickel, and cobalt, or may contain a metal oxide transparent conductive material selected from the group consisting of $In_2O_3$-based materials including ITO ($Sn:In_2O_3$), ZnO-based materials including AZO (Al:ZnO), GZO (Ga:ZnO), BZO (B:ZnO), and IZO (In:ZnO), and IGZO-based materials (refer to Alexandra B. etc., SCIENCE, Vol. 331, No. 6015, pp. 290-291 (2011) and Phili T. etc., Nature Photonics, Vol. 6, pp. 259-264 (2012)).

In the above-described optical filter, a material of a film disposed between the first and second conductive thin films, a material filling the apertures, and a material filling patterned gaps of the second conductive thin film may be an identical material and contain a material selected from the group consisting of silicon oxide, silicon nitride, titanium oxide, and aluminum oxide. Such use of an identical material allows suppression of reflection at interfaces and enhancement of selectivity of transmitted wavelength.

Optical filters according to embodiments are applicable to light-receiving elements of image sensors, solar cell panels, and the like, light-emitting elements such as LEDs, and display elements of liquid crystal panels and the like to thereby enhance the wavelength selectivity among optical characteristics.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2013-162111 filed in the Japan Patent Office on Aug. 5, 2013, the entire contents of which are hereby incorporated by reference.

What is claimed is:

1. An optical filter that transmits light of a predetermined wavelength, the optical filter comprising:
   a substrate;
   a first conductive thin film in direct contact with the substrate and including a plurality of apertures arranged with a period of less than the predetermined wavelength; and
   a second conductive thin film at least a portion of which faces the apertures and is separated from the apertures; wherein
   a material of a film between the first and the second conductive thin films, a material filling the apertures, and a material filling a plurality of patterned gaps of the second conductive thin film are an identical material and contain a material selected from a group consisting of silicon oxide, silicon nitride, titanium oxide, and aluminum oxide,
   the second conductive thin film includes a coordination geometry pattern having a same period of arrangement as a pattern of the first conductive thin film, and
   the second conductive thin film includes a pattern that is reversed and differently sized than the pattern of the first conductive thin film.

2. The optical filter according to claim 1, wherein the apertures are holes or slits.

3. The optical filter according to claim 1, wherein the second conductive thin film is patterned with the period of arrangement of the apertures.

4. The optical filter according to claim 1, wherein the first conductive thin film contains a metal or an alloy of the metal, the metal being selected from a group consisting of aluminum, copper, silver, gold, titanium nitride, zirconium nitride, nickel, and cobalt, or contains a metal oxide transparent conductive material selected from a group consisting of $In_2O_3$-based materials including ITO ($Sn:In_2O_3$), ZnO-based materials including AZO (Al:ZnO), GZO (Ga:ZnO), BZO (B:ZnO), and IZO (In:ZnO), and IGZO-based materials.

5. The optical filter according to claim 1, wherein the second conductive thin film contains a metal or an alloy of the metal, the metal being selected from the group consisting of aluminum, copper, silver, gold, titanium nitride, zirconium nitride, nickel, and cobalt, or contains a metal oxide transparent conductive material selected from the group consisting of $In_2O_3$-based materials including ITO ($Sn:In_2O_3$), ZnO-based materials including AZO (Al:ZnO), GZO (Ga:ZnO), BZO (B:ZnO), and IZO (In:ZnO), and IGZO-based materials.

6. The optical filter according to claim 1, wherein each of the first conductive thin film and the second conductive thin film contains a metal or an alloy of the metal, the metal being selected from the group consisting of aluminum, copper, silver, gold, titanium nitride, zirconium nitride, nickel, and cobalt, or contains a metal oxide transparent conductive material selected from the group consisting of $In_2O_3$-based materials including ITO ($Sn:In_2O_3$), ZnO-based materials including AZO (Al:ZnO), GZO (Ga:ZnO), BZO (B:ZnO), and IZO (In:ZnO), and IGZO-based materials.

* * * * *